US006156411A

United States Patent [19]

Jennings

[11] Patent Number: 6,156,411

[45] Date of Patent: Dec. 5, 2000

[54] DECORATIVE BACKLIT COMPONENTS USING TRANSPARENT THERMOPLASTIC ELASTOMERS AND METHODS OF MAKING THE SAME

[75] Inventor: Walter R. Jennings, Youngstown, Ohio

[73] Assignee: General Motors Corporation, Detroit, Mich.

[21] Appl. No.: 09/020,217

[22] Filed: Feb. 6, 1998

[51] Int. Cl.[7] ...................... B32B 27/14

[52] U.S. Cl. .................. 428/195; 428/204; 428/206; 428/207; 264/132; 156/275.5; 156/244.11; 156/242

[58] Field of Search .................. 362/23, 28, 29, 362/31, 85, 239; 200/314, 345, 512; 428/204, 206, 207, 195; 156/275.5, 244.11, 242; 264/132; 430/412, 500, 481, 195

[56] References Cited

U.S. PATENT DOCUMENTS

| | | | |
|---|---|---|---|
| 5,095,409 | 3/1992 | Dematteo et al. | 362/23 |
| 5,432,684 | 7/1995 | Fry et al. | 362/30 |
| 5,718,326 | 2/1998 | Larose et al. | 200/314 |
| 5,736,233 | 4/1998 | Fye | 128/204 |
| 5,747,756 | 5/1998 | Boedecker | 200/54 |

*Primary Examiner*—Merrick Dixon
*Attorney, Agent, or Firm*—Richard A. Jones

[57] ABSTRACT

A method of making soft touch components such as a switch button in an automobile. The component part is molded out of optically clear thermoplastic elastomer. In the molding process, a thin decorative ink film is molded onto the surface the part. The decorative film may consist of multiple layers, incorporating colors, graphics and different textures. The backlighting will occur through the transparent optically clear thermoplastic elastomer.

6 Claims, 3 Drawing Sheets

43 40 36 48 26 70 54 52 38

DECORATIVE BACKLIT COMPONENTS USING TRANSPARENT THERMOPLASTIC ELASTOMERS AND METHODS OF MAKING THE SAME

TECHNICAL FIELD

This invention relates to backlit components, and more particularly to decorative backlit components for use in vehicles.

BACKGROUND OF THE INVENTION

Heretofore soft to the touch components such as switch buttons used in vehicles had been manufactured by first molding the component out of a clear thermoset silicone material. The molded component is then painted with the silicone ink of the desired color for the surface of the component of the part, and graphics are laser etched through the thin top layer of the silicone paint. This process may, under certain circumstances, have an adverse environmental impact. Further, often the quality of the backlit color is difficult to control.

The present invention provides advantages over and alternatives to the prior art.

SUMMARY OF INVENTION

The present invention utilizes a new technique to manufacture soft touch components such as a switch button in an automobile. The component part is molded out of optically clear thermoplastic elastomer. In the molding process, a thin decorative ink film is molded onto the surface the part. The decorative film may consist of multiple layers, incorporating colors, graphics and different textures. The backlighting will occur through the transparent optically clear thermoplastic elastomer and through lighter colored portions of decorative ink cured on the surface of the substrate.

These and other objects, features and advantages of the present invention will become apparent from the following brief description of the drawings, detailed description, and appended claims and drawings.

DETAILED DESCRIPTION

Decorative backlit components according to the present invention are manufactured utilizing thermoplastic elastomers having unique synthetic compounds which combine the properties of vulcanized rubber with the processing advantages of conventional thermoplastics. A suitable material is a rubber polymer that has thermoplastic properties which allow it to soften and flow under heat and then recover to its structure on cooling. The elastomeric properties of the material allow the material to be stretched and then to retract to its original shape quickly. Suitable thermoplastic elastomer materials for making a backlit decorative component according to the present invention are available from GLS Corporation under the trade name DYNAFLEX. A suitable thermoplastic elastomer material has super clear optical properties having a clarity of 35 to 60 Shore A, and super soft properties of about the 3 on the Shore A scale. A suitable material is believed to be a tri-block copolymer including polymer regions of styrene-rubber-styrene. As an example the material may include styrene-butadiene-styrene segments. A suitable thermoplastic elastomer material is also available from Network Polymers Inc., under the trade name SOFTFLEX.

Figure 1:
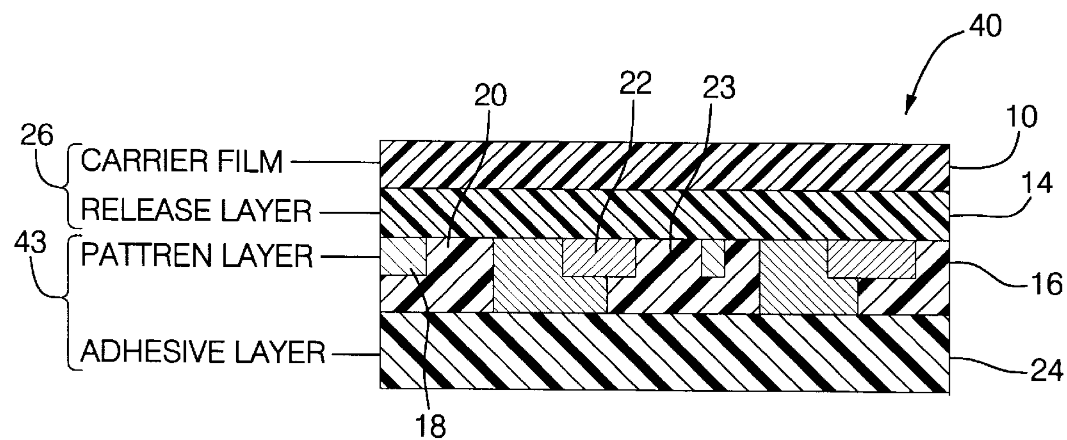
FIG. 1 illustrates a foil composition utilized to deposit and cure a decorative ink pattern on the outer surface out a thermoplastic elastomer component according to the present invention.

The thermoplastic elastomers material is molded in place with a heat transfer printing film. FIG. 1 illustrates a suitable heat transfer printing film. The heat transfer printing film has an upper carrier layer 10 which is helpful in an automated process for making the decorative backlit components which will be described in greater detail hereafter. A release film 14 is provided over the carrier layer 10 to allow easy removal of the molded part from a molding die when the molding operation is completed. The carrier film 10 and the release layer 14 together make up what will hereafter be referred as a foil 26. A pattern layer 16 may be provided over the release layer 14 and includes a design of desired configuration to be seen on the surface of the decorative backlit component. The pattern layer 16 may include portions which contain black ink 18, clear portions or light color ink portions 20 , textured portions 23, and\or portions including inks of a variety of colors 22. An adhesive layer 24 is provided over the pattern layer 16 and holds the decorative pattern onto an underlying optically clear thermoplastic elastomer substrate. The pattern layer 16 and the adhesive layer 24 together are hereafter referred to as the printed pattern portion 43.

Figure 2:
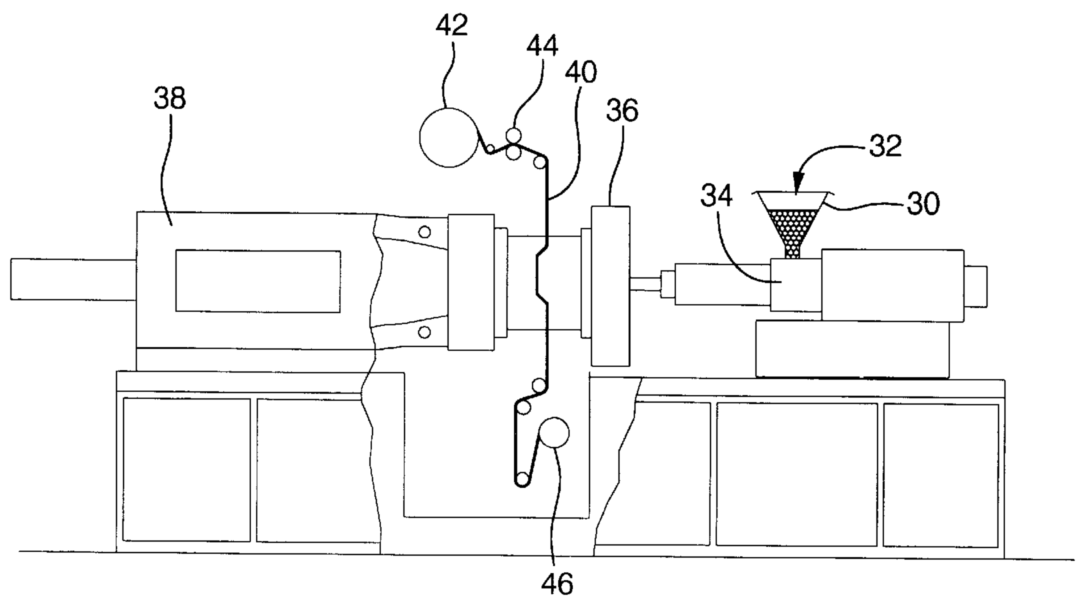
FIG. 2 illustrates a molding apparatus useful in making a decorative backlit component according to the present invention.

FIG. 2 illustrates a molding apparatus for making a decorative backlit component such as a switch key in automobile according to present invention. The molding apparatus includes a hopper 30 having resin pellets 32 therein for delivery to a heating element 34 that heats the resin pellets and delivers molten resin (by a screw not shown) to a mold cavity. The mold cavity is defined in part by a stationary mold platen 36, and a movable mold platen 38 that moves from side to side to open and close the mold structure. A heat transfer printing film 40 is delivered to the mold cavity from a supply roll 42 that is directed through a plurality of rollers 44. The used foil portion 26 of the film is collected on a scrap roll 46.

Figure 3:
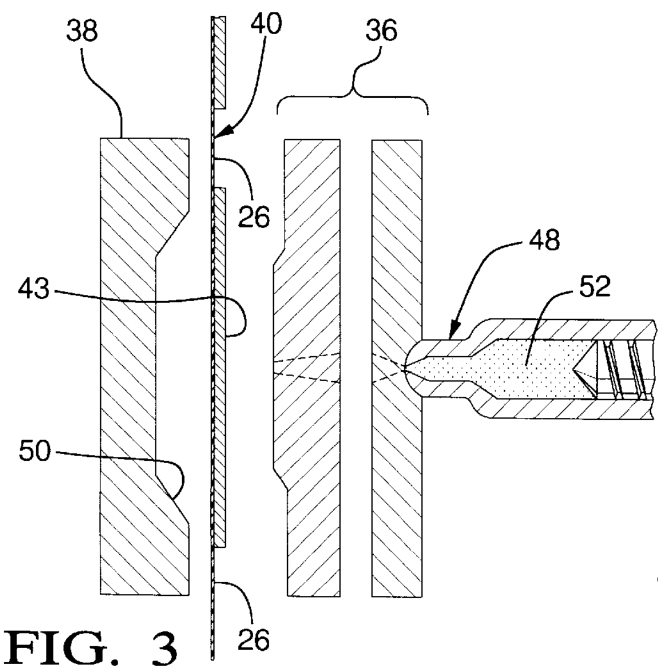
FIG. 3 is an enlarged view of portions of the apparatus of FIG. 2 showing the step of registering a composite foil, having intermittent decorative patterns deposited thereon, in alignment with a molding cavity.

Referring now to FIG. 3, it can be seen that the heat transfer printing film 40 has a printed pattern portions 43 intermittently deposited on the foil portion 26 of the film. Therefore, the first step in the molding process is to advance the heat transfer printing film so that the printed pattern portion 43 is aligned with the mold cavity 50.

Figure 4:
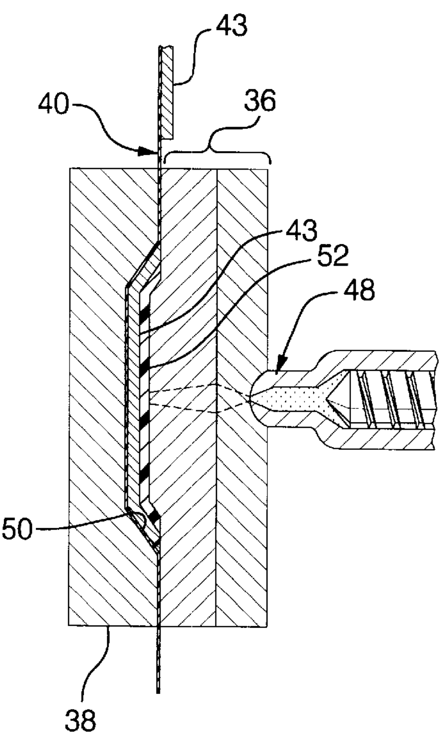
FIG. 4 illustrates the step of injecting a resin into a mold cavity to produce a optically clear, soft to the touch thermoplastic elastomer substrate having a decorative ink deposited on our surface.

Referring now to FIG. 4, thereafter, the movable platen 38 is advanced towards the stationary platen 36 to close the mold cavity and molten resin 52 is injected into the cavity forcing the decorative ink pattern portion 41 of the film against the cavity wall 50 of the movable platen 38 so that the decorative ink is cured on the outer surface of the molded product upon completion of the molding operation.

Figure 5:
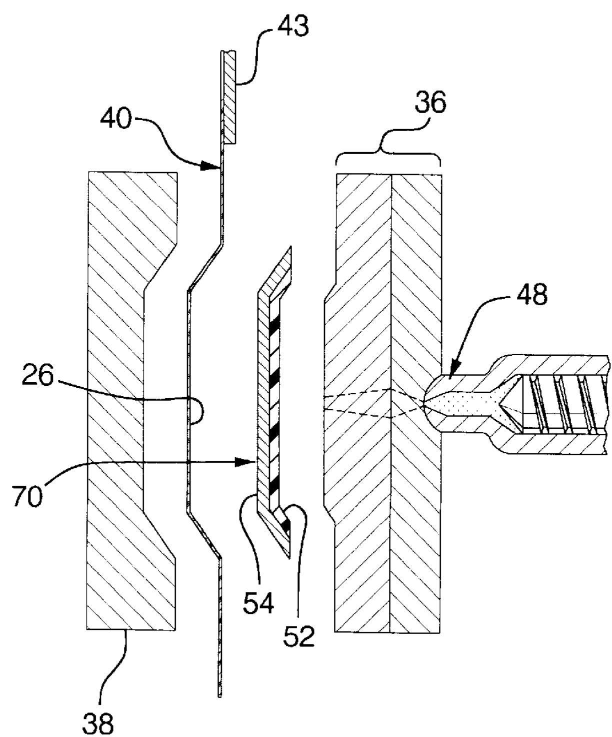
FIG. 5 illustrates the step of removing a molded product from the mold cavity according to the present invention from the molding apparatus.

Referring now to FIG. 5, after a suitable amount of molten resin has been injected and cured in the mold cavity, the movable mold platen 38 is moved away from a stationary platen 36 and due to the release layer on the heat transfer printing film, the molded part is easily removed from the cavity and from the foil portion 26. The resultant product is a decorative component 70 having a flexible, soft to the touch, optically clear thermoplastic elastomer substrate portion 52 and having an outer surface layer 54 comprising a decorative ink cured on the substrate 52.

Of course the component according to the present invention may be made by a variety of processes known to those skilled in the art including two shot molding operations. Further, selective portions of the decorative layer 54 may be etched to provide backlit graphics as desired.

Figure 6:
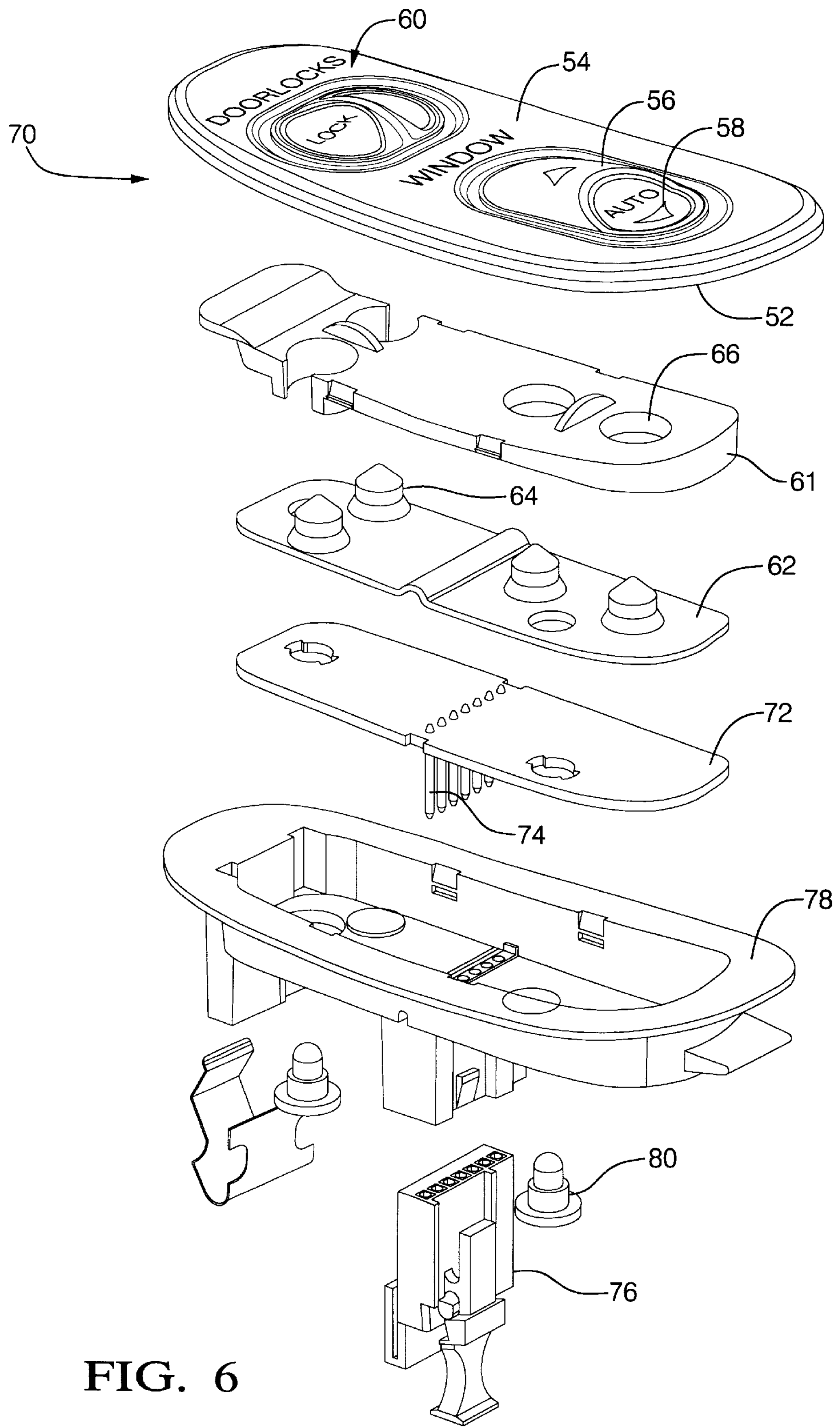
FIG. 6 is an exploded view of the switch control for positioning an armrest of a motor vehicle utilizing a decorative backlit component according to the present invention.

Referring now to FIG. 6, an electronic component utilizing a decorative backlit component 70 of present invention is shown in an exploded view. The decorative backlit component includes an optically clear, soft to the touch, thermoplastic elastomer substrate 52 having an outer surface 54 with a decorative ink cured thereon to form an artistic design 56, symbols 58 or writing 60. For purposes of illustration, in this case the writing 60 would correspond to locations where no ink or a lighter color ink was deposited or cured on the surface of the optically clear thermoplastic substrate such as area 20 of the pattern layer 16 shown in FIG. 1 so that light may be shown through these portions. Such a system may include a light pipe 61 underlying the decorative backlit component 70. A switch pad 62 having switch closing components 64, such as collapsible elastomer domes with conductive pellets on the underside, may be provided under the light pipe 61 and extending through holds 66 of the light pipe for engagement with the underside of the decorative backlit component 70. A printed circuit board 72 may underlie the switch pad 62 so that the collapsible domes 64 are positioned over spaced apart electrical traces of circuits defined in part on the print circuit board. Such a dome switch configuration is shown in Assignee's co-pending patent application, entitle "Latching Rocker Switch" U.S. Ser. No. 08/900,670 filed Jul. 25, 1997, the disclosure of which is hereby incorporated by reference. The printed circuit board may include outwardly extending electrical pins 74 for engagement with an electrical connector 76 connected to wire harness (not shown) for electrical communication with other devices in the vehicle. A housing 78 may be provided to enclose various switch components and to carry a light source 80 such as a light bulb and operatively connected to the light pipe 61 for providing light to the decorative backlit component 70 so that light may be transmitted through areas portions of the decorative ink such as at locations where the writing 60 is shown in FIG. 6.

What is claimed is:

1. A product including a decorative backlit component including an optically clear thermoplastic elastomer substrate molded from material including a tri-block portion with styrene ends, and a decorative layer having an decorative ink in mold deposited on an outer surface of the substrate and so that light may be shown through the substrate and portions of the decorative layer.

2. A product as set forth claim 1 wherein the substrate is molded from material including styrene-butadiene segments and has a claritg of 35 to 60 shore Å.

3. A product as set forth in claim 1 further comprising switch elements underlying the substrate comprising elastomer domes with electrical elements on an underside and wherein the substrate has a hardness of about 3 when measured on the "shore A" durometer hardness scale the substrate being sufficiently flexible so that the switch elements may be engaged by pressing down on the substrate to collapse the elastomer domes.

4. A product as set forth in claim 1 wherein the outer surface of the substrate has portions without any decorative ink deposited thereon and through which light may be transmitted.

5. A product as set forth in claim 1 wherein the outer surface of the substrate has portions with decorative ink of varying colors has been deposited.

6. A method of making a decorative backlit component comprising the steps of providing a heat transfer printing film having an outer carrier film layer, a release layer, a pattern layer having decorative ink on selective portions, and an outer adhesive layer; depositing the heat transfer printing film in a mold cavity and injecting an optically clear thermoplastic elastomer material into the mold cavity so that the carrier layer is forced against a wall of the mold cavity, the thermoplastic elastomer material including tri-block portions having styrene ends, and curing the thermoplastic elastomer material and the decorative ink to produce a decorative backlit component having a flexible, soft to the touch, optically clear substrate having a decorative layer cured on the outer surface of the substrate so that light may be transmitted through the substrate and portions of the decorative layer.

* * * * *